United States Patent [19]
Fain

[11] 3,738,699
[45] June 12, 1973

[54] MODULAR CAMPING UNIT FOR VEHICLES

[75] Inventor: Robert P. Fain, Kansas City, Mo.

[73] Assignee: Coming Enterprises, Kansas City, Mo.

[22] Filed: July 23, 1971

[21] Appl. No.: 165,524

[52] U.S. Cl. .................................. 296/23 R, 5/118
[51] Int. Cl. ............................................. B60p 3/32
[58] Field of Search ................... 296/23 R; 5/118; 108/11, 13, 50, 59, 106, 107

[56] References Cited
UNITED STATES PATENTS
3,165,350  1/1965  Willson ............................... 296/23

*Primary Examiner*—Philip Goodman
*Attorney*—Bradley and Wharton

[57] ABSTRACT

A modular multipurpose camping unit permits conversion of a conventional truck type vehicle into a camper vehicle. A planar base member is adapted to be disposed on the floor of the vehicle and has rigidly secured thereto support structure which rises above the base member to present a seat. The structure is formed in a U-shaped configuration with a pair of opposed legs and an interconnecting bight portion. In the cutaway section between the legs a planar component is disposed which can either be placed in raised relationship to the seat to present a table or moved into planar alignment with the seat whereby to cooperate with the latter and present a platform surface. The surface is covered with a cushion material which serves as a bed or as a play area for children.

8 Claims, 4 Drawing Figures

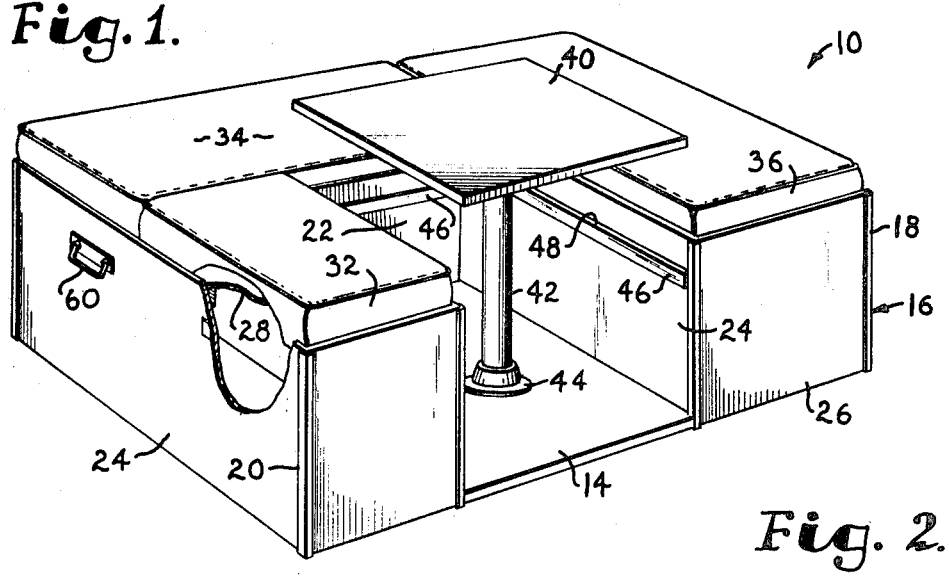
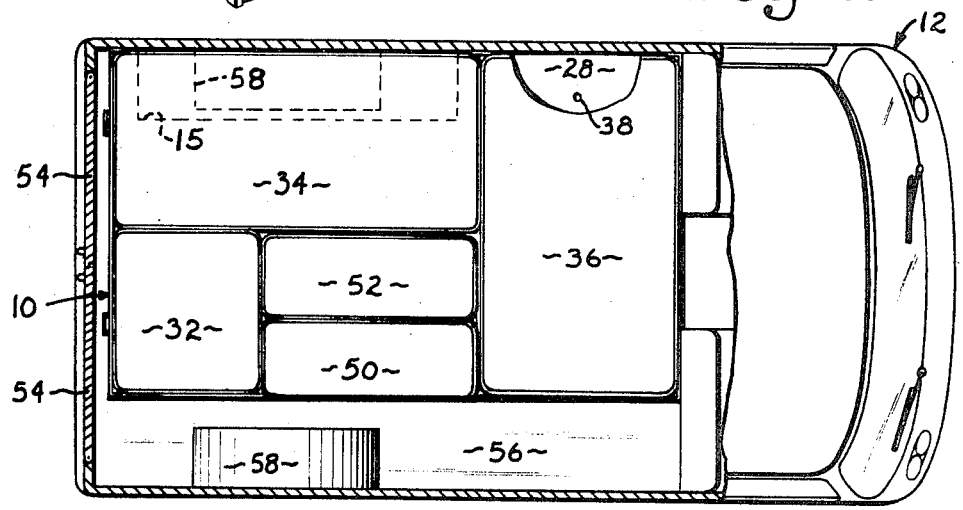
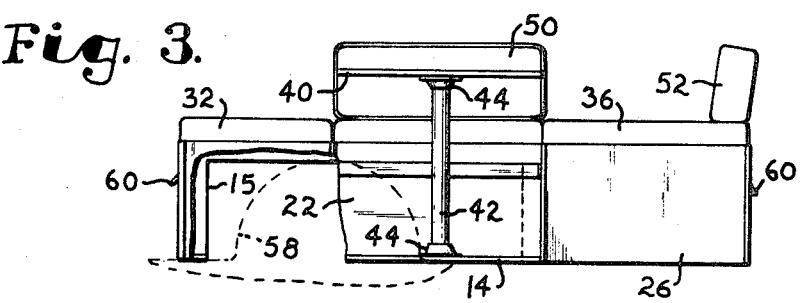
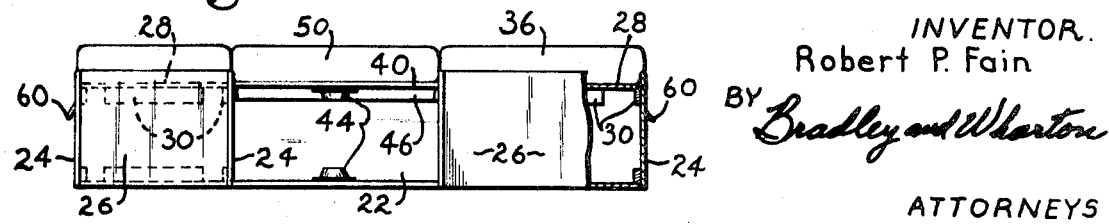
INVENTOR.
Robert P. Fain
BY Bradley and Wharton
ATTORNEYS

MODULAR CAMPING UNIT FOR VEHICLES

This invention relates to accessory equipment for vehicles and, more particularly, to apparatus for permitting occasional conversion of a conventional vehicle into a camper vehicle.

Vehicles particularly designed for use as "campers" have become increasingly popular in recent years. Such vehicles have generally been patterned after either a conventional pickup truck or a van type truck and are for the large part merely modifications of such trucks. With either a pickup or van type truck, it has heretofore been necessary to permanently modify the truck in order to incorporate the desirable features of a camper. Particularly, it is necessary that even the simplest type of camper have available for use by occupants a bed, a table, and adequate storage space. When a truck is modified to provide these facilities in what would otherwise be the cargo area of the truck, this area can no longer be utilized to any extent for hauling cargo or the like.

It is therefore an object of the present invention to provide a modular multipurpose unit for vehicles which can be quickly inserted into the cargo area of the vehicle to convert the vehicle into a camper.

As a corollary to the above object, it is an aim of the invention to provide a unit as described above which can also be quickly removed from the vehicle to allow unaltered use of the cargo area.

Another one of the objectives of this invention is to provide a modular multipurpose unit for vehicles which can provide sleeping facilities, a table with an adjacent seating area to accommodate the serving of meals or the like, and substantial storage area, all without permanent alteration of the vehicle in any way.

Yet another one of the objectives of my invention is to provide a multipurpose unit for vehicles as described in the foregoing objects which can be constructed to fit in different sized vehicles.

In the drawing:

FIG. 1 is a perspective view of a modular multipurpose unit constructed in accordance with the present invention;

FIG. 2 is a top plan view of the unit shown in FIG. 1 as it would appear inside a van type vehicle and with the unit disposed to present a sleeping area;

FIG. 3 is a side elevational view of the unit shown in FIGS. 1 and 2 with portions broken away and the table portion of the unit disposed in raised relationship to the adjacent seat; and FIG. 4 is a side elevational view similar to FIG. 3 illustrating the appearance of the unit with the table component in its lowered position whereby it cooperates with the seat to present a platform surface.

Referring initially to FIGS. 1 and 2 of the drawing, the modular multipurpose unit of the present invention is designated generally by the numeral 10 and will be described with reference to a van type truck designated generally by the numeral 12. It is to be understood, of course, that other types of trucks and particularly a covered, shell-type pickup truck could be utilized with the unit 10. The unit 10 includes a generally planar base member 14 having a cutout portion 15 of a generally rectangular configuration along one side. Rising from the member 14 is a support structure designated generally by the numeral 16 which presents a seat in raised relationship to the base member. The structure 16 is of a generally U-shaped configuration with a pair of opposed legs 18 and 20 and an interconnecting bight portion 22. It is to be noted that both the legs 18 and 20 and the bight portions 22 are presented by a hollow polygonal body having sidewalls 24, end walls 26 and recessed uppermost horizontal covers 28. The covers 28 are supported in a well area presented by the uppermost edges of the sidewalls 24 by a plurality of horizontal beams 30 secured to the inside of the sidewalls. The recessed relationship of the horizontal covers 28 relative to the sidewalls 24 provides a retaining edge for a cushion layer presented by cushion sections 32, 34 and 36. Furthermore, the recessed arrangement of the covers 28 retains the latter in place while allowing them to be releasably received on the beams 30. Thus, covers 28 can be raised to provide access to the hollow area therebeneath. To this end, each of the covers 28 is provided with a hole 38 for insertion of a person's finger to facilitate raising of the cover.

Within the cutaway area between the legs 18 and 20 a generally rectangular table component 40 is disposed. The configuration of the table component 40 is complemental to the cutaway area and substantially coextensive therewith. The table 40 is supported in raised relationship to the seating area presented by the structure 16 by an elongated column element 42. First and second frusto-conical female couplings 44 are rigidly secured to the base member 14 and the underside of the table component 40 to releasably receive the ends of the element 42.

Attached to the inside of the legs 18 and 20 and the bight portion 22 on the outside of sidewalls 24 are horizontal support members 46 which present a ledge 48 for supporting the component 40 in planar alignment with the covers 28 as best illustrated in FIG. 4. Manifestly, when the component is to be moved into planar alignment with the covers 28 to present a generally rectangular surface, the element 42 is removed from the couplings 44. A second cushion comprised of sections 50 and 52 is disposed in overlying relationship to the component 40 and contiguous with the sections 32 − 36 to complete the cushion covering over the platform presented by the covers 28 and the component 40. By dividing the cushion over the component 40 into a plurality of sections 50 and 52 these sections may be utilized as back cushions when the component 40 is in its raised, table-presenting position as is illustrated in FIG. 3.

The truck 12 is a van type truck having rear doors 54 which open to allow access to a cargo area designated generally by the numeral 56. The cargo area 56 is normally substantially unobstructed except for the protrusion of wheel wells 58.

To facilitate movement of the unit 10 into the cargo area 56 a pair of handles 60 are disposed on opposite sides of the legs 18 and 20. With the doors 54 open, the unit 10 can be picked up by two persons and easily moved into the cargo area 56. The presence of the cutout portion 15 allows the unit to be moved against one wall of the truck 12 and assures full utilization of the available space. The unit 10 can be used either with the component 40 in its raised or lowered positions. In the raised position the component presents a table adjacent the seating area presented by structure 16 and in its lowered position it cooperates with the covers 28 to present a platform which is suitable as a sleeping area or can be utilized for other purposes. When it is desirable to reconvert the truck 12 for full utilization of the cargo area 56 the unit 10 is simply lifted out of the truck in the same manner in which it was originally moved into the truck. Thus there is a complete absence of permanent installation in the cargo area 56 which would interfere with use of the latter for purposes other than a camping unit.

It will be appreciated that the unit 10 can be utilized with van type trucks of different sizes including those which have two permanent passenger seats as opposed to the single seat which is shown for the truck 12. Also, the unit 10 is well adapted for use in pickup trucks having their cargo area enclosed by a shell covering. It is to be noted that the cutout 15 is substantially larger than the wheel well 58 of the truck 12, thus allowing the unit 10 to be placed in vehicles of different sizes wherein the wheel well 58 would be in a different position.

Having thus described the invention, what is claimed as new and desired to be secured by letters patent is:

1. A modular multipurpose unit for vehicles comprising:
   a base member adapted to be disposed on the floor of a vehicle;
   support structure disposed in a U-shaped configuration on said base member to present a seat,
   said structure comprising a pair of opposed legs, a bight portion, and a cutaway area between said legs; and
   a planar component disposed in said section and adapted to be supported in raised relationship to said seat to present a table,
   said component being complemental in configuration to the configuration of said cutaway area and substantially coextensive with said area,
   said component further being movable into a lowered position to cooperate with said seat and present a platform surface.

2. The invention of claim 1, wherein said structure includes a retaining edge surrounding said seat to present a well for holding in place a cushion disposed on the seat.

3. The invention of claim 1, wherein is included means for supporting said component in planar alignment with said seat.

4. The invention of claim 3, wherein said support means comprises a ledge along said legs and the bight portion of the structure interconnecting said legs.

5. The invention of claim 4, wherein is included cushion means overlying said platform, said cushion means comprising a first cushion portion extending over said seat and received in said well, and a second cushion portion extending over said component, said second portion comprising a plurality of cushion sections adapted to be removed from said component when the latter is in said raised position and utilized as back cushions by persons sitting on said seat.

6. The invention of claim 1, wherein said structure is presented by a hollow polygonal body, said body having a movable section to allow access to the interior of the body whereby the latter can be utilized as a storage compartment.

7. The invention of claim 1, wherein is included an elongated element for supporting said component in said raised position, and first and second couplings secured to said component and said member respectively for releasably receiving the ends of said element when the latter is in its component-supporting position, said element being removable from said couplings to allow said component to be moved into planar alignment with said seat.

8. The invention of claim 7, wherein is included a handle on opposite sides of said structure to facilitate movement of the unit in and out of vehicles.

* * * * *